June 27, 1939.  J. H. POOL  2,164,122
PARACHUTE
Filed Oct. 2, 1936  3 Sheets-Sheet 1

June 27, 1939.　　　　J. H. POOL　　　　2,164,122
PARACHUTE
Filed Oct. 2, 1936　　　3 Sheets-Sheet 3

Patented June 27, 1939

2,164,122

UNITED STATES PATENT OFFICE 2,164,122

PARACHUTE

Joseph Harbit Pool, Henlow Camp, England, assignor to Irving Air Chute of Great Britain Limited, Letchworth Herts, England, a corporation Application October 2, 1936, Serial No. 103,754
In Great Britain October 3, 1935

9 Claims. (Cl. 244—152)

This invention relates to improvements in or relating to parachutes and has for one of its objects to provide equipment in which the load shock to which the parachutist and component parts of the equipment are subjected upon opening of the parachute canopy is very much less than that encountered when using known forms of equipment.

According to the present invention I provide a parachute having a canopy incorporating an air vent, and means whereby the effective area of such vent may be varied automatically during deployment of said canopy.

The aforesaid variation of effective area of the vent may take place between any desired limits; thus, for instance, under some circumstances said vent may be wholly or substantially closed or covered, and under other circumstances said vent may be wholly or substantially wholly opened or uncovered, or the variation may be restricted to any desired range within these limits. In some cases the range may itself be subject to control, for instance by manually operable means.

The aforesaid automatic variation in the effective area of the air vent in the parachute canopy is preferably such that the vent is closed or substantially closed when the canopy first takes the air, and is then permitted to open to its maximum size as the canopy deploys and slight air pressure is established therein, said air vent then being reduced in area as the canopy further deploys and reaching the limit of said reduction in area when complete deployment is attained. In this way rapid initial deployment of the canopy is effected but any sudden transmission of load shock to the parachutist is entirely avoided.

The aforesaid initial closing of the air vent is preferably effected by drawing together the main parachute canopy around said vent, for example with the aid of a pilot or auxiliary parachute and suitably disposed interconnecting rigging lines, and the aforesaid final closing of said vent is preferably effected by applying a cover over said opened vent; such cover being, for instance, drawn over the vent automatically upon deployment of the main canopy, with the aid of interconnecting lines between said cover and the main canopy or the associated shroud lines or parachute harness.

In cases wherein the aforesaid cover is employed in association with the air vent, this may be secured if desired to the main canopy by disrupturable means, such for instance as one or more break cords serving to maintain the cover close to the vent until such time as a determined speed has been attained, whereupon such cord or cords is or are caused to break and automatic variation of the effective area of the vent ensues. These break cords may, for instance, be placed between the margin of the cover and the main canopy or a single cord may extend from said cover to any convenient part of the canopy.

In order that my invention may be well understood I will now describe by way of example some embodiments thereof with reference to the accompanying drawings, in which Figure 1 shows one form of parachute in a partially deployed condition.

Figure 1:
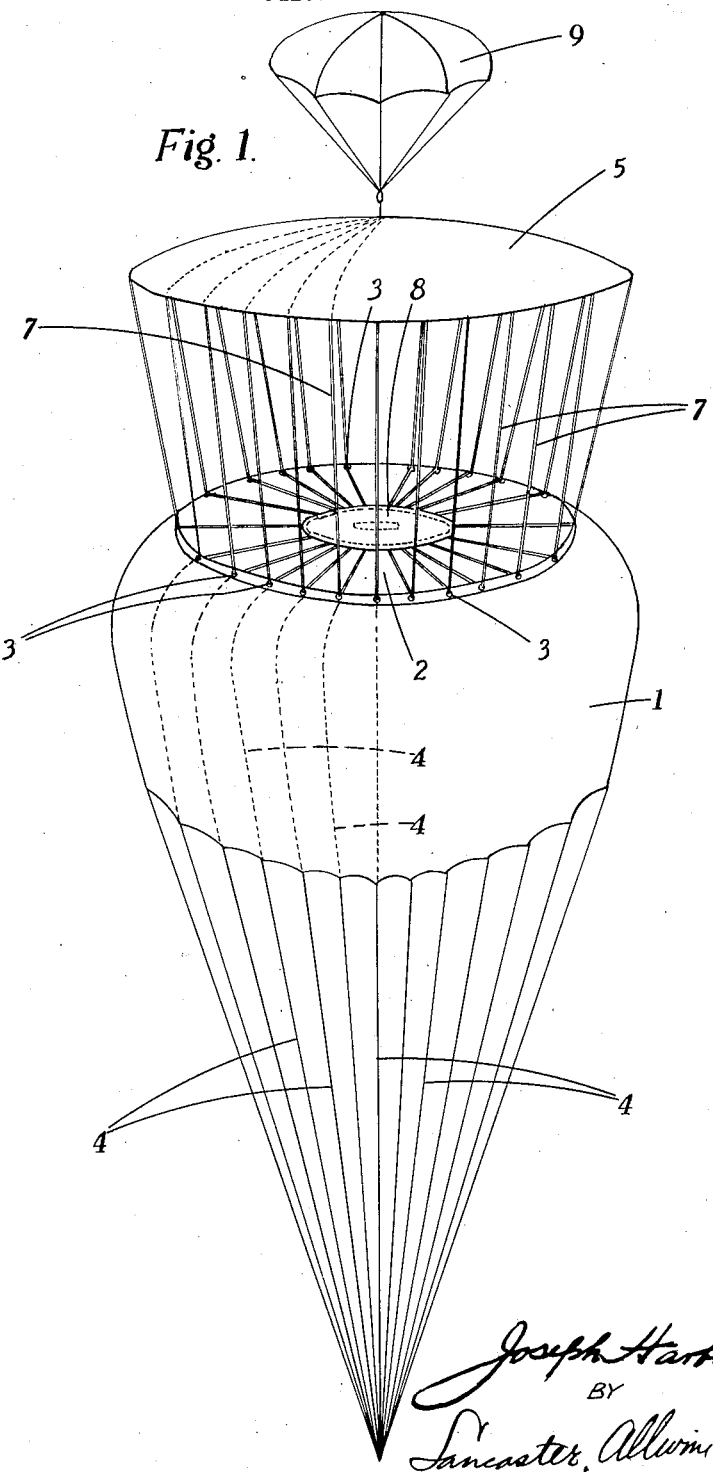
Figure 2:
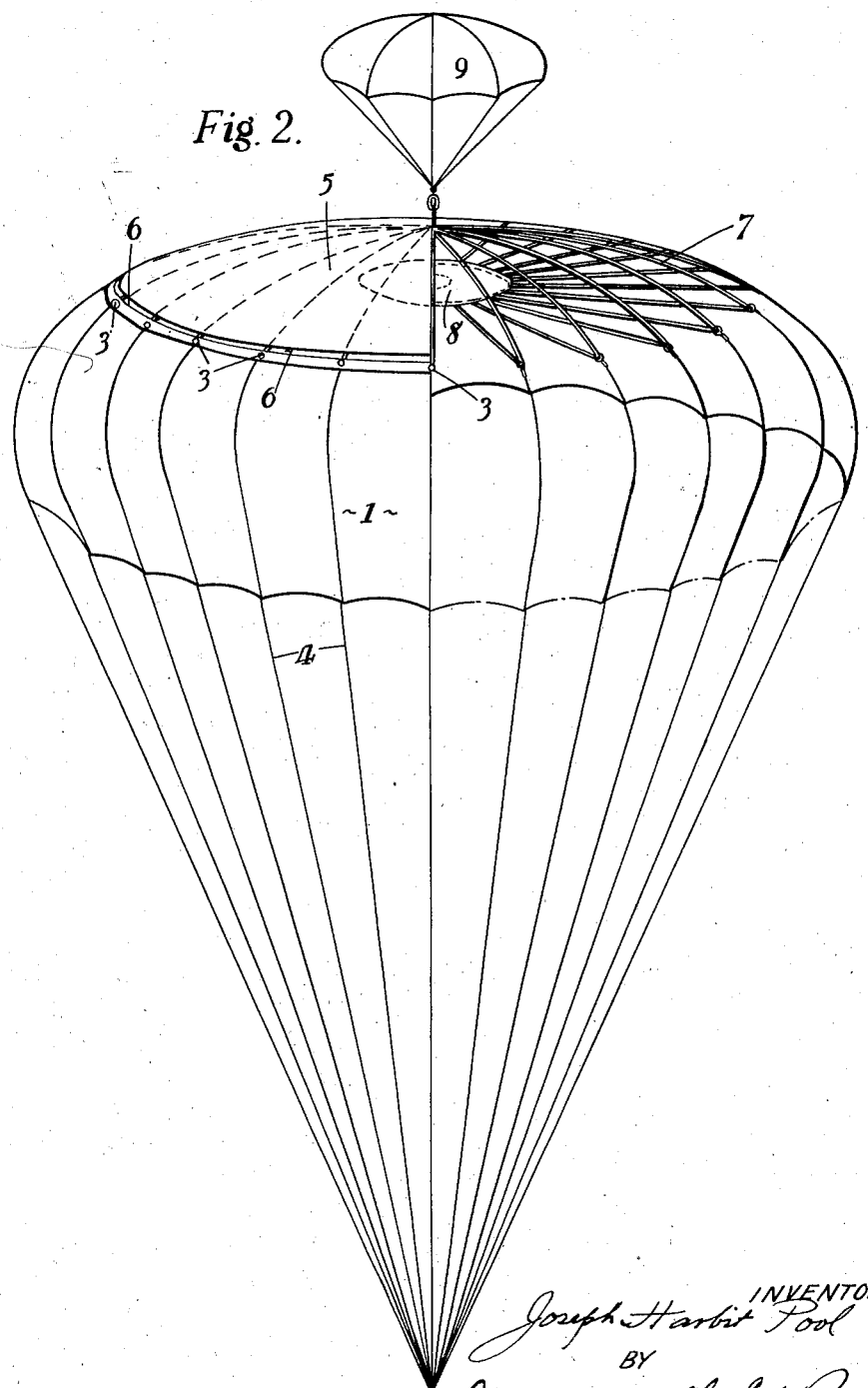
Figure 2 shows the equipment shown in Figure 1 but in a fully deployed condition and with part of the canopy removed.

Referring to Figures 1 and 2 of the drawings, 1 designates the main canopy of the parachute and this includes an air vent 2 which is preferably appreciably larger than the fixed area vent sometimes provided in known forms of parachutes.

A series of eyelets 3 is provided around the margin of the aforesaid vent 2 and the shroud or rigging lines 4 of the parachute preferably extend from said eyelets around the canopy and towards the parachute harness in V-formation and in one or more groups as may be desired.

A cover or closure member 5, preferably made of material similar to that employed in making the canopy 1, is associated with the vent 2 and is of such dimensions that when the parachute is fully deployed there remains an annular air-vent 6, as is shown in Figure 2 of the accompanying drawings. The rest of the vent 2 is entirely masked.

The aforesaid closure member 5 is, in this example, provided with shroud- or rigging-lines 7 extending through the aforesaid eyelets 3 to a disc 8 located centrally with respect to the vent 2, the length of such lines being such that when the canopy 1 is fully deployed the cover 5 is drawn into the position shown in Figure 2, i. e. into its fully closed position.

An auxiliary or pilot parachute 9, which may advantageously be of the known spring-opened kind, is connected to the mid-point of the closure member 5 and in addition to serving the usual function of anchoring the main canopy so that the latter may become unfurled, said pilot parachute effects the initial separation of the closure member 5 from the main canopy 1.

Assuming that a jump is being made and that the parachute has been released from its pack, the operation of the above equipment is as follows:

The pilot parachute opens, and by reason of its anchorage causes unfurling of the main canopy and separation of the closure member 5 therefrom. This separation of the closure member causes the rigging-lines 7 to run through the eyelets 3 and draws together the marginal parts of the canopy around the vent 2, thus substantially closing said vent.

As deployment of the main canopy 1 proceeds, air pressure beneath the canopy forces the marginal parts of the vent 2 apart, thus increasing the dimensions of the air vent and at the same time drawing the closure member downwardly (see the intermediate position shown in Figure 1). Further deployment of the canopy will increase the diameter of the vent but at the same time the effective area of such vent will be decreased, since the closure member moves to a closing position, until finally the condition shown in Figure 2 is established and there remains only a narrow annular air vent. It will be readily appreciated that during the earlier sequence of operations the gradual opening of the air vent resolves the strains which normally result in great shock being applied to the parachutist into increased air slip through the vent, and the later sequence of operations ensures a gradual decrease in the size of the vent until finally the parachute acts as a normal one.

In a modification of the embodiment above described the rigging-lines 7 of the closure member 5, instead of terminating at the disc 8, may extend right across the vent and make engagement with diametrically opposite points in the margin of said vent, the disc 8 making free engagement with the lines or being dispensed with altogether. In this way the closure member 5 is permitted to move away from the main canopy a distance substantially equal to the full diameter of the extended vent, as opposed to only about a third of that distance in the arrangement shown in Figure 1, and thereby effecting a variation in the effective area of the vent, i. e., a smaller cover may be employed and yet provided for a vent opening of increased effective area.

Figure 3:
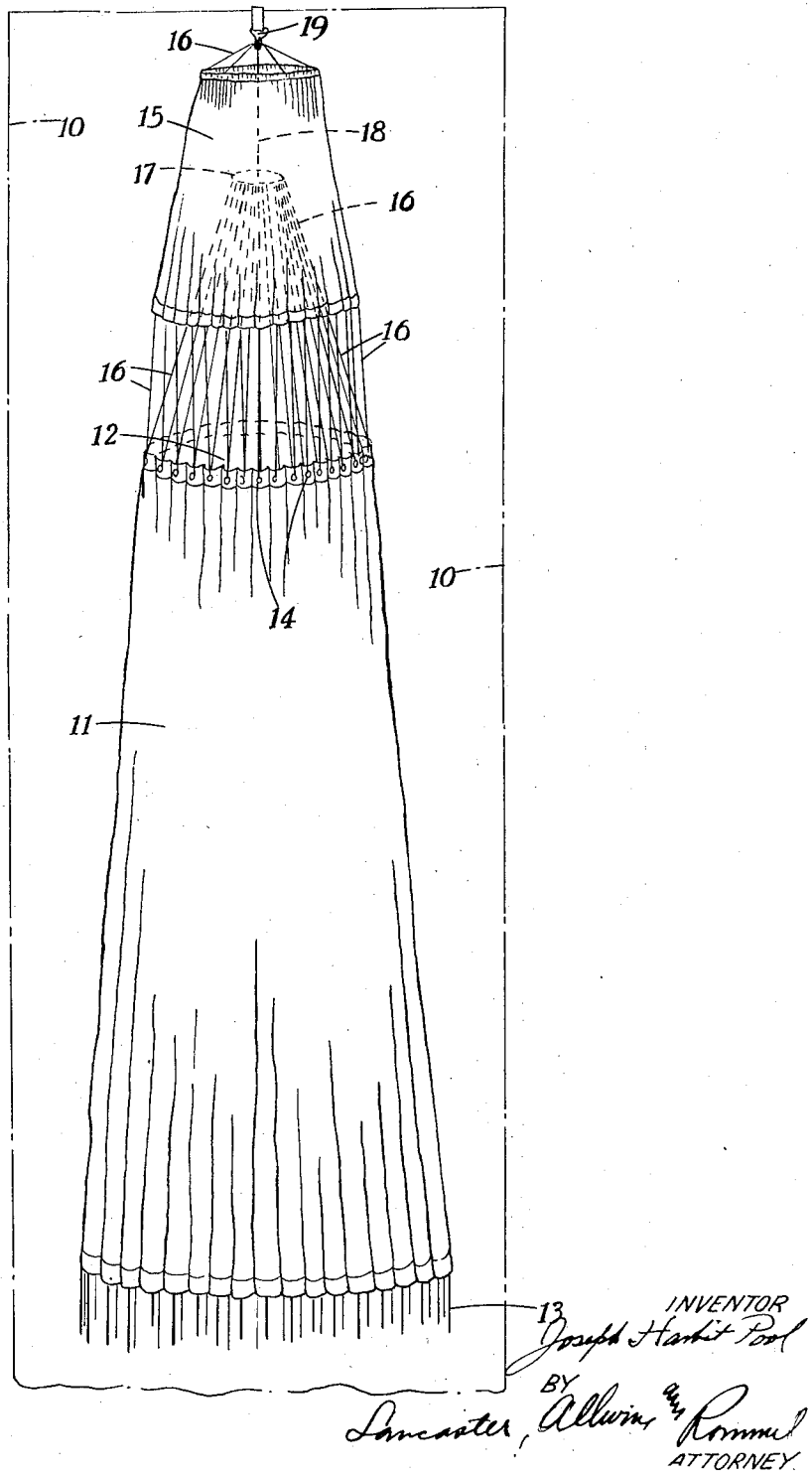
Figure 3 shows a modified arrangement with the canopy in the position it assumes when stretched out on a table for packing.

Figure 3 shows a further modified form of equipment stretched upon a table 10 ready for packing. In this example the main canopy 11 includes a central vent 12 with shroud lines 13 terminating at eyelets 14. A closure member 15 is also secured to the canopy 11 by means of rigging-lines 16 slidably extending through said eyelets 14 and terminating at a disc 17. This disc 17 in this example is connected to the apex of the rigging-lines 16 of the cover member by means of a breakable cord 18. Said cord 18 holds the disc 17 within the cover and therefore prevents the automatic closing of the vent 12 followed by the subsequent expanding and final closing operations previously described until such time as the load on the cover is sufficient to cause said cord to break.

The apex of the rigging-line assembly is connected by means of a snap-hook 19 to the table 10 during the process of folding the parachute and if it is desired to employ an auxiliary or pilot parachute this would, of course, also be connected to said line assembly although the arrangement shown in this figure is primarily for use without an auxiliary parachute.

In operation of the equipment shown in Figure 3 the parachute becomes unfurled but the automatic closing and subsequent expanding of the vent 12 does not ensue until the speed attained and consequent drag on the cover 15 establishes sufficient tension in the cord 18 to break it. Immediately upon rupture of said cord the disc 17 moves downwardly and the rigging lines run outwardly through the eyelets 14 and thereby constrict the marginal parts around the vent and close the latter. Thereafter the operation of the equipment is as described with reference to Figures 1 and 2, i. e., the vent expands, meantime drawing the cover 15 downwardly, increasing the effective area of the vent to a maximum and thereafter decrease said area to a minimum.

In some cases the use of a pilot or auxiliary parachute may be dispensed with or the aforesaid cover may itself be adapted to serve the function of such pilot or auxiliary parachute.

Any suitable means may, if desired, be provided for restricting the range of movement of the cover or closure member. Thus, for instance, the margin of said cover may be secured to the main canopy of the parachute by means of break threads and/or stops may be provided on the rigging-lines of the cover or closure member in order positively to limit the distance to which such cover or closure member can be separated from the parachute canopy and/or to limit the degree to which such parts can approach one another.

Whilst I have hereinbefore given some examples of equipment according to my invention, I wish it to be understood that the specific details may be varied or modified without departing from the scope thereof. Thus, for instance, the parachute canopy may be made of any desired shape and dimensions and from any suitable material, and the air vent may be of any desired dimensions and automatic variation of such dimensions may take place over any desired range. Moreover, the aforesaid cover or closure member may, in some cases, be connected to the parachute harness in such a manner that it is spaced from the vent in the canopy prior to development of the latter but is urged into its closed position when the canopy is fully developed.

I claim:

1. In a parachute construction the combination of a canopy body having a vent opening therein, a cover for said vent opening, and means connected with said cover including a plurality of lines also connected across the vent opening and slidably connected with the canopy body surrounding the vent opening and of such length whereby the cover prior to full deployment of the canopy body will be spaced from the vent opening to permit of a substantial venting of air therethrough and upon greater deployment of the canopy body the said means connecting the closure with the canopy body will automatically pull the closure towards the vent opening for reducing the effective venting area thereof.

2. In a parachute construction the combination of a canopy body having shroud lines attached thereto and a vent opening therein, a closure for reducing the effective area of said vent opening, and flexible means connecting the closure with the canopy body surrounding said vent opening for automatically reducing the effective area of the vent opening as the deployment of the canopy body increases during a parachute drop, said closure bearing such a relation to the vent opening that when the vent opening is fully opened the closure will cover only the central portion of the vent opening and leave an annular ring vent.

3. In a parachute construction a canopy body having a vent opening therein, shroud lines attached to the canopy body, a closure for said vent opening, rigging lines connected with said closure surrounding the same, said rigging lines having slidable connection with the canopy body surrounding said vent opening and being of such lengths with respect to each other and with respect to the size of the vent opening and so connected that as deployment of the parachute canopy increases the actual area of the vent opening will increase for the purpose of pulling the closure towards said vent opening and reducing the effective venting area thereof.

4. In a parachute construction the combination of a canopy body having a vent opening therein, a closure for the vent opening, means connecting the closure with the canopy body to permit the canopy body to move towards or away from the vent opening for varying the effective spill area of the canopy body, and releasable means normally retaining the closure for limited movement away from the spill opening, said last mentioned means being releasable upon the application of a predetermined load shock at the time of opening the canopy body.

5. In a parachute the combination of a canopy structure, load supporting shroud line means connected with the canopy structure, said canopy structure having a vent opening therein, a closure for the vent opening, means connecting the closure with the canopy structure so that it may have a variable position with respect to the vent opening for varying the air spill therethrough, and a pilot parachute connected with said closure.

6. In a parachute the combination of a main canopy having a vent opening therein, load supporting shroud line means connected with said main canopy, a closure for the vent opening, connecting means attaching the closure to the main canopy for automatic air spill control of the vent opening, and a pilot parachute connected with said closure.

7. In a parachute canopy structure the combination of a main canopy body having an air spill vent opening therein, load supporting means connected with the canopy body, a closure for the air spill opening, means connecting the closure with the main canopy, and frangible means breakable upon a predetermined load shock during a parachute descent normally holding said closure in a predetermined air venting relation with respect to the vent opening of said main canopy.

8. In a parachute canopy structure the combination of a main canopy body having an air spill vent opening therein, load supporting means connected with the canopy body, a closure for the air spill opening, means connecting the closure with the main canopy, frangible means breakable upon a predetermined load shock during a parachute descent normally holding said closure in a predetermined air venting relation with respect to the vent opening of said main canopy, and a pilot parachute connected with said closure.

9. In a parachute structure the combination of a main canopy body having a vent opening therein and load supporting means attached thereto, a closure for said opening which in its maximum closed relation with the vent opening is of a size to not fully cover said vent opening so as to permit a limited air spill at all times, means connecting the closure with the main canopy for automatically varying the size of the vent opening at different degrees of deployment of said main canopy, and pilot parachute means connected with said closure.

JOSEPH HARBIT POOL.